(12) United States Patent
Mironets et al.

(10) Patent No.: US 10,556,270 B2
(45) Date of Patent: Feb. 11, 2020

(54) ADDITIVE MANUFACTURING SYSTEM FOR MINIMIZING THERMAL STRESSES

(71) Applicant: United Technologies Corporation, Hartford, CT (US)

(72) Inventors: Sergey Mironets, Charlotte, NC (US); Alexander Staroselsky, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 989 days.

(21) Appl. No.: 14/689,845

(22) Filed: Apr. 17, 2015

(65) Prior Publication Data

US 2015/0314373 A1 Nov. 5, 2015

Related U.S. Application Data

(60) Provisional application No. 61/986,937, filed on May 1, 2014.

(51) Int. Cl.
| | |
|---|---|
| *B29C 67/00* | (2017.01) |
| *B22F 3/105* | (2006.01) |
| *B22F 3/00* | (2006.01) |
| *B33Y 10/00* | (2015.01) |
| *B33Y 30/00* | (2015.01) |
| *B33Y 40/00* | (2020.01) |

(52) U.S. Cl.
CPC ............ *B22F 3/1055* (2013.01); *B22F 3/003* (2013.01); *B33Y 10/00* (2014.12); *B33Y 30/00* (2014.12); *B33Y 40/00* (2014.12)

(58) Field of Classification Search
CPC ................ B22F 3/1055; B22F 7/062; B22F 2003/1056; B29C 64/20; B33Y 30/00; B33Y 40/00
USPC .................................................. 425/425, 375
See application file for complete search history.

(56) References Cited

U.S. PATENT DOCUMENTS

| | | | | | |
|---|---|---|---|---|---|
| 2,169,279 | A | * | 8/1939 | Oyster | B22C 15/10 164/38 |
| 5,387,380 | A | * | 2/1995 | Cima | B29C 41/006 425/425 |
| 6,682,688 | B1 | * | 1/2004 | Higashi | B29C 64/153 264/497 |
| 8,961,860 | B2 | * | 2/2015 | Eriksson | B22F 3/1055 264/308 |
| 9,527,165 | B2 | * | 12/2016 | Bruck | B29C 64/153 |

* cited by examiner

*Primary Examiner* — Joseph S Del Sole
*Assistant Examiner* — Thu Khanh T Nguyen
(74) *Attorney, Agent, or Firm* — Kinney & Lange P.A.

(57) ABSTRACT

A build plate for an additive manufacturing system is disclosed. The build plate includes a support structure, a sub-plate, and one or more transducers. The support structure is configured to support a stack of sintered layers of a pulverant material. Further, the support structure extends orthogonally to a build direction. The sub-plate is arranged along the support structure, and defines a transducer cavity. One or more transducers are arranged in the transducer cavities. The one or more transducers are operable to cause vibration of the support structure and the stack parallel to the build direction. Such vibration relieves internal stresses caused by sintering of the stack.

15 Claims, 3 Drawing Sheets

ADDITIVE MANUFACTURING SYSTEM FOR MINIMIZING THERMAL STRESSES

CROSS REFERENCE TO RELATED APPLICATION(S)

This application claims the benefit of U.S. Provisional Application No. 61/986,937 filed May 1, 2014, for "ADDITIVE MANUFACTURING SYSTEM FOR MINIMIZING THERMAL STRESSES", by S. Mironets and A. Staroselsky.

BACKGROUND

Additive manufacturing processes, such as selective laser sintering and direct metal laser sintering, are used for applications such as prototyping and limited quantity production runs. Some of the benefits of additive manufacturing processes include the ability to produce highly complex parts quickly and efficiently, and to modify design specifications of the desired part, for example by modifying CAD specifications, without re-tooling casting or machining equipment used for traditional, subtractive manufacturing processes.

Laser sintering is utilized in many additive manufacturing processes. In a laser sintering process, a layer of pulverant material is applied to a work stage, and the layer is sintered using a laser into a solid or semi-solid sheet. Additional layers of pulverant material are applied over the work stage, and sintered to the underlying layer. In this way, a complex three-dimensional part is built up layer-by-layer.

Laser sintering operations are typically performed near the solidus temperature of the material used in the additive manufacturing process. The powder is heated by the laser to sinter (or sometimes melt) and combined with adjacent material. As soon as sintering is complete, the sintered portion is cooled below the melting temperature. In order to rapidly manufacture a part, the laser heats those portions that are to be solidified into the part as quickly as possible. This rapid heating and cooling can cause residual thermal stresses.

Residual thermal stresses generated during laser powder bed fusion not only affect geometrical accuracy of the components, but often cause process interruptions. The cumulative effect of thermal stresses in layered manufacturing can lead to distortion of parts, especially those parts having thin features. The components must be adequately anchored to the build plate to avoid excessive distortion. In extreme cases, the cumulative effect of thermal stresses can cause the powder recoater to stall on top of a previously solidified layer which has delaminated and jutted above the working stage. In other cases, components may crack due to internal stress, causing unwanted internal voids in the manufactured part. In both of these situations, the additive manufacturing process must be interrupted and the problem resolved before the part can be finished. As a result of this type of process interruption, the oxygen level in the additive manufacturing station may rise above an acceptable level, causing surface oxidation and lack of fusion to the subsequent layer.

SUMMARY

A build plate for an additive manufacturing system is disclosed. The build plate includes a support structure, a sub-plate, and one or more transducers. The support structure is configured to support a stack of sintered layers of a pulverant material. Further, the support structure extends orthogonally to a build direction. The sub-plate is arranged along the support structure, and defines a transducer cavity. One or more transducers are arranged in the transducer cavities. The one or more transducers are operable to cause vibration of the stack parallel to the build direction. Such vibration relieves internal stresses caused by sintering of the stack.

DETAILED DESCRIPTION

Figure 1:
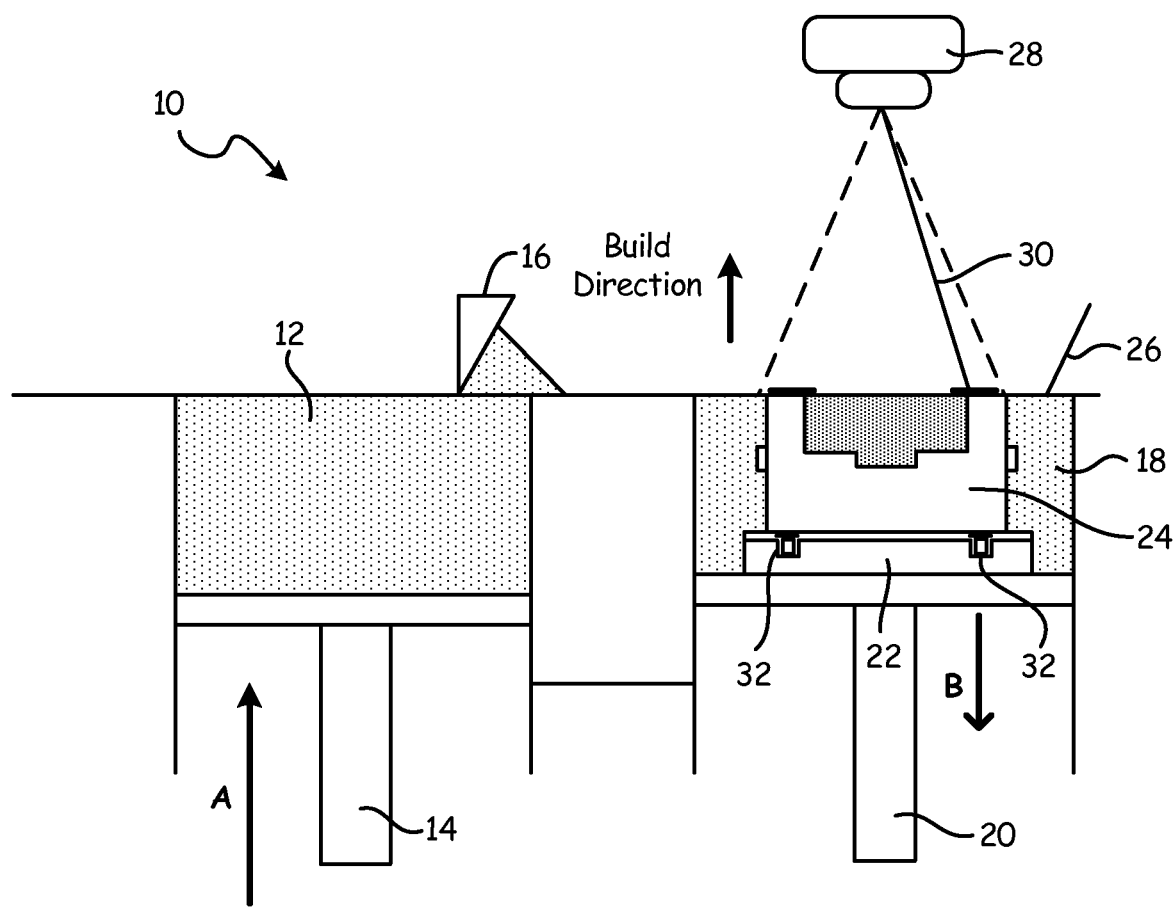
FIG. 1 is a cross-sectional view of an additive manufacturing system including permanently installed transducers.

FIG. 1 is a cross-sectional view of additive manufacturing system 10. Additive manufacturing system 10 is a system used to manufacture components in a layer-by-layer manner. Additive manufacturing system 10 includes source powder bed 12, first platform 14, recoater blade 16, build powder bed 18, second platform 20, build plate 22, stack 24, working surface 26, laser 28, and radiation beam 30. Build plate 22 includes permanently installed transducers 32.

Source powder bed 12 is a source supply of pulverant material. For example, source powder bed 12 may consist of a powdered metal. The composition of source powder bed 12 is determined by the part being manufactured. First platform 14 is configured to push source powder bed 12 upwards, as indicated by arrow A in FIG. 1.

After powder that makes up source powder bed 12 is pushed upwards by first platform 14, it can be moved by recoater blade 16. Recoater blade is used to transfer a layer of pulverant material from source powder bed 12 to build powder bed 18. As powder is added to build powder bed 18, second platform 20 is lowered, as indicated by arrow B. Second platform 20 is attached to build plate 22, which in turn is attached to stack 24. Due to the movement of first platform and opposite movement of second platform, as indicated by arrows A and B, the topmost surface of build powder bed 18 remains stationary, at working surface 26.

Stack 24 is the result of several iterations of selective sintering. Stack 24 is made up of the same material as build powder bed 18, but the pulverant material has been sintered such that stack 24 is a single monolithic piece.

Laser 28 is capable of directing radiation beam 30 towards working surface 26. Often, additive manufacturing involves creating a CAD model of a desired part, then using a computer to "slice" the CAD model into a series of nearly 2-dimensional layers that are sintered to make the part. Laser 28 may direct radiation beam 30 to selectively sinter those portions of build powder bed 18 at working surface 26 that correspond to one such layer. When additive manufacturing is complete, unsintered powder in build powder bed 18 can be removed, and stack 24 has the same shape as the desired part.

During additive manufacturing, repeated heat cycling can cause thermal stresses in the layers. In aggregate, these stresses can cause deformations, cracking, and/or distortions in stack 24. In order to alleviate these stresses, permanently installed transducers 32 are positioned within transducer cavities defined by build blade 22. Build plate 22 is mechanically coupled to stack 24, in that stack 24 is sintered directly on to build plate 22. Thus, vibrations caused by permanently installed transducers 32 that are positioned within holes defined by build plate 22 can be transferred to stack 24 during additive manufacturing.

Permanently installed transducers 32 are configured to cause vibrations that propagate parallel to the build direction. Permanently installed transducers 32 are permanent in that they do not change position while additive manufacturing takes place. However, permanently installed transducers 32 may be moved within build plate 22 between the manufacture of parts. Often, build plate 22 will define multiple transducer cavities to allow permanently installed transducers 32 to be positioned in a variety of configurations.

The vibration caused by permanently installed transducers 32 provides Ultrasonic Impact Treatment (UIT) of stack 24. UIT relieves thermal stresses in a very short time, and for many additive manufacturing systems can be accomplished in less time than it takes for recoater blade 16 to return to "home" position, to gather more material from source powder bed 12. Often, UIT can require five seconds or less to adequately reduce stress in stack 24.

UIT can replace heat-based internal stress relief systems. UIT is often less power-intensive, less time-intensive, and more effective at eliminating internal stresses, as compared to a heat/annealing based internal stress relief system. UIT matches the fundamental resonant frequencies of a component to create standing waves within a part, thereby reducing internal stresses. The frequency and amplitude of vibrations emitted by permanently installed transducers 32 can be modified to ensure that UIT was effective. For example, in some embodiments, testing can be done using eddy currents, neutron scattering, or x-ray diffraction testing can be performed on stack 24 to ensure that UIT was effective. These non-destructive tests can be used to provide feedback and control the process parameters.

By mounting permanently installed transducers 32 in build plate 22, stress relief can be accomplished as the part is being built, without increasing fabrication time. Furthermore, because UIT can be accomplished during construction, and internal stress can be relieved even after deposition of only a few layers. Stress relaxation is especially important during the deposition of the first few layers of stack 24, to ensure proper binding to build plate 22 and prevent distortions that can be propagated throughout subsequently applied layers of stack 24.

Permanently installed transducers 32 may be positioned throughout build plate 22 in any pattern. In various embodiments, build plate 22 may have few or very many permanently installed transducers 32 installed therein. For embodiments in which build plate 22 is designed for a specific part, permanently installed transducers 32 may be positioned throughout build plate 22 in such a way as to optimize the propagation of ultrasonic waves throughout a specific stack 24. UIT can be especially beneficial for elongated structures and structures with high aspect ratio components. For example, the high pressure compressor of a gas turbine engine often includes stator sections that include a rail and several blades, each of which is as narrow as 0.05 cm thick while extending as much as 18 cm tall and 3 cm wide.

In alternative embodiments, additive manufacturing may be accomplished by a variety of other known techniques, such as laser powder depositionor stereolithography. These additive manufacturing methods, and many others, each build a component in a layer-by-layer manner on some form of a build plate, and thus the installation of transducers may accomplish stress relief.

Figure 2:
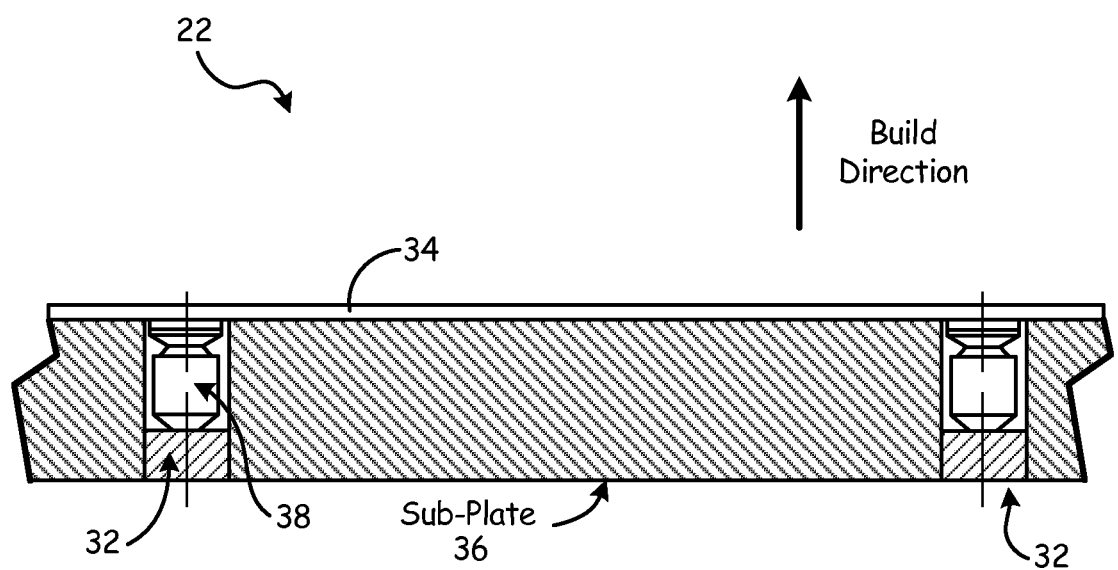
FIG. 2 is a cross-sectional view of a build plate including permanently installed transducers.

FIG. 2 is a cross-sectional view of build plate 22 including permanently installed transducers 32. Build plate 22 includes support structure 34 on the edge furthest in the build direction. Underneath support structure 34 is sub-plate 36, which provides structural support. Sub-plate 36 also houses permanently installed transducers 32. Permanently installed transducers 32 include pins 38. Support structure 34 facilitates direct contact between pins 38 and an adjacent stack 24 (FIG. 1).

As previously mentioned, permanently installed transducers 32 may be positioned throughout build plate 22 to disperse ultrasonic waves throughout component 24 (FIG. 1). Furthermore, permanently installed transducers 32 may be operated at a variety of frequencies. It is often desirable to cause a standing wave in the ultrasonic range to reduce or eliminate internal stresses. As stack 24 (FIG. 1) grows, its fundamental frequencies may change. Thus, permanently installed transducers 32 may operate with differing frequencies and amplitude based on the geometry of the partially or fully constructed stack 24 (FIG. 1).

Figure 3:
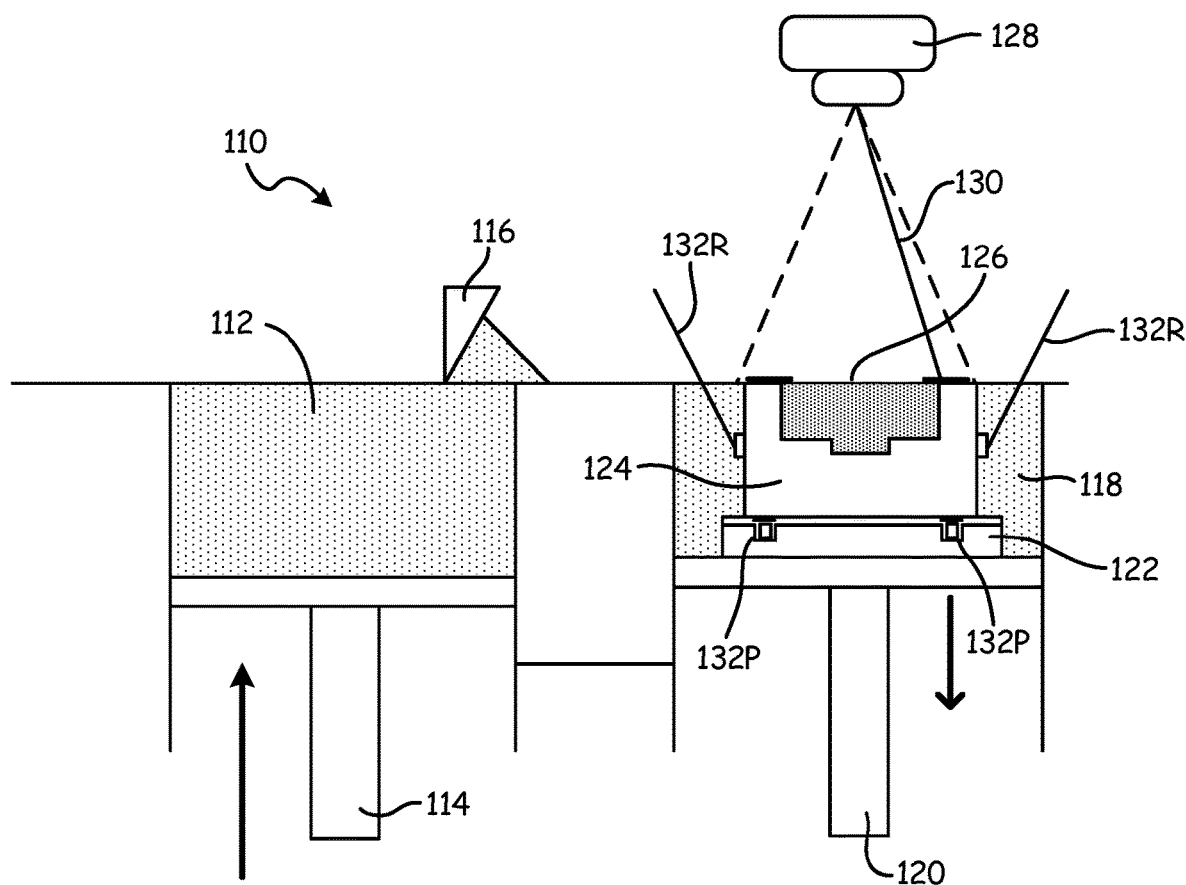
FIG. 3 is a cross-sectional view of an additive manufacturing system including both permanently and retractably installed transducers.

FIG. 3 is a cross-sectional view of additive manufacturing system 110. Additive manufacturing system 110 includes source powder bed 112, first platform 114, recoater blade 116, build powder bed 118, second platform 120, build plate 122, stack 124, working surface 126, laser 128, and radiation beam 130. Build plate 122 includes permanently installed transducers 132P and retractably installed transducers 132R.

Additive manufacturing system 110 is similar to additive manufacturing system 10 of FIG. 1. However, unlike additive manufacturing system 10, additive manufacturing system 110 shown in FIG. 3 includes transducers both on build plate 122, and also attached directly to stack 124. In particular, permanently installed transducers 132P are arranged throughout build plate 122, in the same way that permanently installed transducers 32 (FIG. 1) were housed in build plate 22 (FIG. 1). Retractable transducers 132R are attached to stack 124 directly, for example by brazing, welding, soldering, or any other method suitable for the material that makes up stack 124.

Retractable transducers 132R are useful for large and/or complex stacks 124. For such stacks 124, ultrasonic waves produced by permanently installed transducers 132P may be attenuated before reaching working surface 126, permitting internal stresses to accumulate and potentially cause failure of manufacturing or inferior finished parts. Retractable transducers 132R may be attached to stack 124 partway through additive manufacturing, so that UIT can reach the topmost layers of even large, complex components.

Discussion of Possible Embodiments

The following are non-exclusive descriptions of possible embodiments of the present invention.

A build plate for an additive manufacturing system, includes a support structure, a sub-plate, and one or more transducers. The support structure is configured to support a stack of sintered layers of a pulverant material. The support structure extends orthogonally to a build direction. The sub-plate is arranged along the support structure, and defines a transducer cavity. One or more transducers are arranged in the transducer cavity. The transducers are operable to cause vibration of the support structure and the stack parallel to the build direction. This vibration relieves internal stresses caused by sintering of the stack.

The build plate of the preceding paragraph can optionally include, additionally and/or alternatively, any one or more of the following features, configurations and/or additional components:

The one or more transducers may be arranged throughout the sub-plate in a pattern corresponding to the shape of the stack.

The one or more transducers may include a pin oriented in the build direction.

The build plate may be coupled to a platform that is movable parallel to the build direction.

The transducers may be operable in the ultrasonic frequency range.

The one or more transducers may be each operable within a range of frequencies, and/or within a range of amplitudes.

The operating frequency and/or amplitude of the one or more transducers may be selected based on the shape of the stack.

According to a further embodiment, an additive manufacturing system includes a pulverant material supply system configured to provide a pulverant material to a working surface, a movable platform movable parallel to a build direction, a build plate movable arranged on the movable platform, and a radiation system. The build plate is being movable from the working surface along with the movable platform, and includes one or more transducers operable to cause vibration of the build plate parallel to the build direction. The radiation system is configured to provide a radiation beam to selectively sinter the pulverant material at the working surface to form a stack of sintered layers.

The additive manufacturing system of the preceding paragraph can optionally include, additionally and/or alternatively, any one or more of the following features, configurations and/or additional components:

The one or more transducers may be arranged throughout the build plate in a pattern corresponding to the shape of the stack.

The one or more transducers may include a pin oriented in the build direction.

The one or more transducers may be operable in the ultrasonic frequency range.

The one or more transducers may each be operable within a range of frequencies and/or amplitudes.

The operating frequency and/or operating amplitude of the one or more transducers may be selected based on the shape of the stack.

The pulverant material supply system may include a recoater blade.

The radiation source may be a laser.

The stack of layers of sintered pulverant material may be arranged between the build plate and the working surface, and one or more retractable transducers may be coupled to the stack of layers of sintered pulverant material.

The one or more retractable transducers may be operable to cause vibration of the stack.

According to a further embodiment of the invention, a method of additively manufacturing a part includes arranging a build plate at a working surface, positioning a pulverant material on the build plate, selectively sintering a first layer of the pulverant material with a radiation beam, moving the build plate away from the working surface, opposite a build direction, selectively sintering additional layers of the pulverant material to form a stack, and applying ultrasonic vibration to the stack during at least some of the steps of additive manufacturing.

The method of the preceding paragraph can optionally include, additionally and/or alternatively, any one or more of the following features, steps, configurations and/or additional components:

Applying ultrasonic vibration to the stack may include operating a transducer that is mechanically connected to the build plate.

Applying ultrasonic vibration to the stack may further include operating a retractable transducer that is mechanically connected to the stack and arranged between the build plate and the working surface.

Although the present invention has been described with reference to preferred embodiments, workers skilled in the art will recognize that changes may be made in form and detail without departing from the spirit and scope of the invention.

The invention claimed is:

1. A build plate for an additive manufacturing system, the build plate comprising:
a support structure configured to support a stack of sintered layers of a pulverant material, the support structure extending orthogonally to a build direction;
a sub-plate arranged along the support structure, the sub-plate defining a transducer cavity;
one or more ultrasonic transducers arranged in the transducer cavity, wherein the one or more ultrasonic transducers are operable to propagate ultrasonic waves through the support structure and the stack while the pulverant material is being sintered to provide Ultrasonic Impact Treatment (UIT) of the stack by creating standing waves within the stack to relieve internal stresses caused by sintering of the stack.

2. The build plate of claim 1, wherein the one or more ultrasonic transducers are arranged throughout the sub-plate in a pattern corresponding to a shape of the stack.

3. The build plate of claim 1, wherein the one or more ultrasonic transducers include a pin oriented in the build direction.

4. The build plate of claim 1, wherein the build plate is coupled to a platform that is movable parallel to the build direction.

5. The build plate of claim 1, wherein:
the one or more ultrasonic transducers are each operable within a range of ultrasonic frequencies, and/or;
the one or more ultrasonic transducers are each operable within a range of amplitudes.

6. The build plate of claim 5, wherein an operating ultrasonic frequency and/or an operating amplitude of the one or more transducers are selected based on a shape of the stack.

7. An additive manufacturing system comprising:
a pulverant material supply system configured to provide a pulverant material to a working surface;
a movable platform movable parallel to a build direction;
a build plate arranged on the movable platform, the build plate being movable from the working surface along with the movable platform, the build plate including one or more ultrasonic transducers operable to propagate ultrasonic waves through the build plate and the pulverant material parallel to the build direction while the pulverant is being sintered to provide Ultrasonic Impact Treatment (UIT) of the sintered pulverant material by creating standing waves within the sintered pulverant material to relieve internal stresses caused by sintering of the pulverant material; and a radiation system configured to provide a radiation beam to selectively sinter the pulverant material at the working surface to form a stack of sintered layers.

8. The additive manufacturing system of claim 7, wherein the one or more ultrasonic transducers are arranged throughout the build plate in a pattern corresponding to a shape of the stack.

9. The additive manufacturing system of claim 7, wherein the one or more ultrasonic transducers include a pin oriented in the build direction.

10. The additive manufacturing system of claim 7, wherein:
the one or more ultrasonic transducers are each operable within a range of ultrasonic frequencies, and/or;
the one or more ultrasonic transducers are each operable within a range of amplitudes.

11. The additive manufacturing system of claim 10, wherein an operating ultrasonic frequency and/or an operating amplitude of the one or more ultrasonic transducers is selected based on a shape of the stack.

12. The additive manufacturing system of claim 7, wherein the pulverant material supply system includes a recoater blade.

13. The additive manufacturing system of claim 7, wherein the radiation source is a laser.

14. The additive manufacturing system of claim 7, wherein:
the stack of layers of sintered pulverant material is arranged between the build plate and the working surface; and
one or more retractable ultrasonic transducers are coupled to the stack of layers of sintered pulverant material.

15. The additive manufacturing system of claim 14, wherein the one or more retractable transducers are operable to produce UIT of the stack.

* * * * *